(12) United States Patent
Gibson (10) Patent No.: US 7,889,420 B2
(45) Date of Patent: Feb. 15, 2011

(54) PLASMON-BASED COLOR TUNABLE DEVICES

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/557,405

(22) Filed: Sep. 10, 2009

(65) Prior Publication Data

US 2009/0323171 A1  Dec. 31, 2009

Related U.S. Application Data

(62) Division of application No. 11/888,356, filed on Jul. 31, 2007, now abandoned.

(51) Int. Cl.
G02B 26/00 (2006.01)
G09G 3/34 (2006.01)

(52) U.S. Cl. .............. 359/296; 359/452; 359/228; 359/245; 359/315; 345/107; 356/441; 356/445; 313/498

(58) Field of Classification Search .......... 359/228, 359/245, 277, 296, 322, 452, 585, 586; 356/402, 356/406, 445; 313/498, 506–512; 345/107; 250/226, 559.16
See application file for complete search history.

(56) References Cited

U.S. PATENT DOCUMENTS

| | | | |
|---|---|---|---|
| 5,023,139 A | 6/1991 | Birnboim et al. | |
| 5,451,980 A | 9/1995 | Simon et al. | |
| 5,570,139 A * | 10/1996 | Wang | 348/744 |
| 5,986,808 A | 11/1999 | Wang | |
| 6,097,456 A | 8/2000 | Wang | |
| 6,122,091 A * | 9/2000 | Russell et al. | 359/245 |
| 6,278,540 B1 | 8/2001 | Wang | |
| 6,323,989 B1 * | 11/2001 | Jacobson et al. | 359/296 |
| 6,446,782 B1 * | 9/2002 | Patrick | 198/370.06 |
| 6,721,083 B2 | 4/2004 | Jacobson et al. | |
| 6,992,826 B2 | 1/2006 | Wang | |
| 7,295,364 B2 * | 11/2007 | Yamamoto | 359/296 |
| 7,538,335 B1 * | 5/2009 | Leard | 250/559.16 |
| 7,599,066 B2 * | 10/2009 | Fukuda | 356/445 |
| 7,626,179 B2 * | 12/2009 | Gorrell et al. | 250/396 R |
| 7,656,576 B2 * | 2/2010 | Suwabe et al. | 359/296 |
| 2009/0162003 A1 * | 6/2009 | Gollier et al. | 385/12 |

OTHER PUBLICATIONS

Khlebtsov, N.G. et al., "Light Absorption by the Clusters of Colloidal Gold and Silver Particles Formed During Slow and Fast Aggregation" Colloid J. 62:6:765-779 (2000).

Nordlander, P. et al., "Plasmon Hybridization in Nanoparticle Dimers" Nano Letters vol. 4, No. 5, 899-903 (2004).

(Continued)

Primary Examiner—Loha Ben (57) ABSTRACT

A color-tunable, reflective, paper-like display utilizes the unique optical properties of nano-engineered metal and metal-dielectric composite structures that exhibit a plasmon resonance. By changing the dielectric properties of a medium in which these structures are embedded, or by changing the spatial relationship of these structures, their optical absorbance and scattering spectra can be tuned. This enables simpler pixel architectures with better performance than is possible with fixed-color technologies. Low power video rate operation can be achieved in a paper-like display.

18 Claims, 7 Drawing Sheets

OTHER PUBLICATIONS

Quinten, M., "The Color of Finely Dispersed Nanoparticles" Appl. Phys. B 73, 317-326 (2001).

Riikonen, Sampsa et al., "Plasmon Tunability in Metallodielectric Metamaterials" Physical Review B 71: 235104-1 to 235104-6 (2005).

Shevchenko, Elena V. et al., "Structural Diversity in Binary Nanoparticle Superlattices" Nature vol. 439, 55-59 (2006).

Sun, Y., "Increased Sensitivity of Surface Plasmon Resonance of Gold Nanoshells Compared to That of Gold Solid Colloids in Resp to Env. Changes" Anal.Chem 74:5297-5305 (2002).

Malinsky, M.D. et al., "Chain Length Dependence and Sensing Capabilities of the Localized Surface Plasmon Resonance . . . " J. Am. Chem. Soc. 123:1471-1482 (2001).

Mock, Jack et al., "Local Refractive Index Dependence of Plasmon Resonance Spectra from Individual Nanoparticles" Nano Letters vol. 3, No. 4, 485-491 (2003).

Wang, Y. et al., "Electrooptic Reflection With Surface Plasmons" Optical and Quantum Electronics 25: S925-S933 (1993).

Wang, Yu, "Voltage-induced Color-Selective Absorption With Surface Plasmons" Appl. Phys. Lett. 67: 19: 2759-2761 (1995).

Wang, Yu, "Electronically Tunable Mirror With DSurface Plasmons" SPIE vol. 3292: 103-106 (1998).

Wang, Yu, "Surface Plasmon Tunable Filter and Spectrometer-on-a-chip" SPIE vol. 3118, 288-294 (1997).

Govorov, Alexander O. et al., "Gold Nanoparticle Ensembles as Heaters and Actuators: melting and Collective Plasmon Resonances" Nanoscale Res Lett 1:84-90 (2006).

* cited by examiner

PLASMON-BASED COLOR TUNABLE DEVICES

CROSS-REFERENCE TO RELATED APPLICATIONS

This patent document is a divisional and claims benefit of the earlier filing date of U.S. patent application Ser. No. 11/888,356, filed Jul. 31, 2007, now abandoned, which is hereby incorporated by reference in its entirety.

BACKGROUND

A number of different technologies have been used to provide electronic displays with paper-like appearance. For example, one class of paper-like displays includes electrophoretic displays, which use electrical fields to move "electronic ink" relative to a background. An electrophoretic display, in one configuration, fills a volume between a transparent viewing plate and a background plate with a liquid containing a dark dye and light colored particles. Charging agents cause the particles to hold a charge, so that voltages locally applied to pixel areas of the plates cause the light colored particles to move closer to or further from the viewing plate. The pixel areas in which the light colored particles collect near the viewing plate then appear lighter than pixels where the lighter particles are repelled from the viewing plate. Such displays may provide superior image quality, in particular a wider viewing angle and higher contrast, in some applications when compared to current LCD and plasma displays. However, current paper-like displays have several disadvantages or challenges that must be overcome to obtain greater commercial success.

One disadvantage is that many paper-like display technologies that are currently under development would require high current and/or high power to operate at video rates. In particular, many paper-like displays must switch a large volume of material or chromophores from one state to another to produce an adequate change in the optical properties of a pixel. For example, typical dye molecules have extinction coefficients on the order of $10^5$ $M^{-1}$ $cm^{-1}$ or less, requiring about $10^{16}$ or more molecules per square centimeter of a display in order to absorb sufficient light in the absorptive state. At video switching rates, currents on the order of hundreds of $mA/cm^2$ are needed if a unit charge must be delivered to each dye molecule to affect the change. Thus, display techniques that rely, for example, on redox reactions to switch dye molecules require unacceptably high currents for displaying video. The same holds true for electrochromic displays.

Another disadvantage is the slow speed that current paper-like displays typically provide. In particular, many existing paper-like display technologies involve phenomena that are intrinsically slow. For example, some electrophoretic or electrochemical techniques require species/particles to diffuse or drift through fluids over distances that create a slow response.

Another difficulty for current paper-like displays is achieving high quality color. In particular, most paper-like display technologies can only produce binary color from one material set (e.g., switch from one fixed color to another fixed color or from one fixed color to either black or white). Because of this, at least three sub-pixels using different material sets must be used when employing a side-by-side sub-pixel architecture with fixed colors (e.g., red-green-blue or cyan-yellow-magenta). This limits the maximum fraction of reflected light for some colors to about ⅓, so that the pixels of this type cannot produce saturated colors with good contrast. The alternative is to use a stacked architecture, but this also limits the achievable reflectivity and contrast because of the large number of layers required. Additionally, the required stacked architectures for color pixels can be complicated and difficult to manufacture. In particular, systems with a stacked geometry using active layers that can achieve only certain fixed colors generally require a minimum of four active layers (e.g., CYMK) and associated backplane electronics. This complexity impedes performance, increases manufacturing costs, and lowers yields. In addition, some active structures are particularly difficult to manufacture such as stacked reservoirs for electro-wetting devices. Finally, some reflective pixel technologies, such as front-back electrophoretic devices, cannot be stacked because the active layers cannot be put into a transparent state.

Another disadvantage of some current paper-like displays is their limited useful life. In particular, to sustain video rate operation for a period of years requires at least $10^9$ reversible changes of optical properties even for a relatively low duty cycle. Achieving the desired number of cycles is particularly difficult in paper-like displays using techniques based on chemical reactions such as redox reactions, or techniques that involve mixing and separation of species.

In view of the current limitations of paper-like display technologies, better systems and methods for producing and operating paper-like displays are desired.

SUMMARY

In accordance with an aspect of the invention, a display structure such as a pixel in a paper-like display includes a medium containing or adjacent to particles that have a plasmon resonance. The medium has dielectric properties that can be altered through application of an external stimulus, and a tuning system can apply the external stimulus to the media as needed to set the plasmon resonance to correspond to a desired frequency or frequencies of visible light, and thereby tune the color of the display structure.

BRIEF DESCRIPTION OF THE DRAWINGS

Use of the same reference symbols in different figures indicates similar or identical items.

DETAILED DESCRIPTION

In accordance with an aspect of the invention, plasmon resonances in discrete structures provide tunable optical scattering or absorbing mechanisms for binary, multi-step, or continuous color variation suitable for use in still image and video displays. A suitable discrete structure as described further below exhibits plasmon effects and can be a particle (sometimes referred to herein as a nanoparticle or by the acronym "NP") or a discrete optical scattering or absorbing feature of a continuous surface. Some more specific examples of suitable discrete structures that exhibit plasmon effects include solid or hollow nanometer-scale spheres of a metal such as gold, silver, aluminum, platinum, or alloys of such metals, solid or hollow metal particles having non-spherical shapes, composite particles made of both metal and dielectric materials, and layered structures containing multiple metal and/or dielectric materials such as layered concentric spherical shells or cylinders or layered films.

Plasmons, which are quantized oscillations of the free electron gas density in a metal or other structure, affect how electromagnetic radiation or light reacts with a structure and thereby determine the apparent color of the structure. This generally occurs through the coupling of surface plasmons with light to form surface plasmon-polaritons. Tuning the color of a discrete structure is possible because the plasmon resonant frequency of such structures generally depends on the size and shape of the discrete structure, the dielectric properties of the discrete structure, and the dielectric properties of the surroundings of the discrete structure. Thus, the optical absorption and scattering spectra (and therefore the color) of a discrete structure can be varied by altering any one or more of these characteristics. The following describes a number of techniques and structures for tuning the optical spectra of devices containing discrete structure having plasmon resonances and several implementations using color-tunable structures in display technologies and particularly in paper-like displays.

One example of a discrete structure is an NP that is a solid spherical metal sphere having a diameter in a range of about 3 to 150 nanometers. Equation 1 indicates the approximate functional form for the cross-section σ for scattering of light of wavelength λ from such a sphere in a media having dielectric constant $\varepsilon_{med}$ when the sphere has a complex dielectric function $\varepsilon_{NP}$ and a diameter d of the sphere is much less than the wavelength λ of incident light. The dielectric function $\varepsilon_{NP}$ of the NP generally has a complicated dependence on the band structure of the metal in the NP, but Drude theory gives a crude/simple approximation of the dielectric function as shown in Equation 2. In Equation 2, $\omega_p$ is the bulk plasmon frequency of the metal, and ω is the angular frequency of the scattered light. The dielectric function $\varepsilon_{NP}$ can be negative as shown by Equation 2, and as a result, the scattering cross-section σ of the metal sphere has a resonance at an incident light frequency $\omega_R$ approximately given in Equation 3, where $\eta_{med}$ is the refractive index of the medium surrounding the NP. Equation 3 predicts, for example, that a change in refractive index $\eta_{med}$ from 1.0 to 1.5 is sufficient to change the plasmon resonance of an NP from 470 to 640 nm, a range that spans the most important portion of the visible spectrum. This analysis somewhat overestimates the shift in plasmon resonance for metal particles. More sophisticated analysis predicts a plasmon shift of about 210 nm per unit refractive index change for spherical silver nanoparticles as described by Malinsky, M. D., *J. Am. Chem. Soc.* 2000, 123, 1471-1482, which matches well with experiment as described by Mock, J. J., et al., Nano Lett. 3, 485 (2003).

$$\sigma \propto \left(\frac{d^6}{\lambda^4}\right)\left(\frac{1}{|\varepsilon_{NP} + 2\varepsilon_{med}|^2}\right) \quad \text{Equation 1}$$

$$\varepsilon_{NP}(\omega) = 1 - \frac{\omega_p^2}{\omega^2} \quad \text{Equation 2}$$

$$\omega_R = \frac{\omega_p}{\sqrt{1 + 2\varepsilon_{med}}} = \frac{\omega_p}{\sqrt{1 + 2\eta_{med}^2}} \quad \text{Equation 3}$$

NPs with other shapes and constructions would typically have similar qualitative behavior to a solid sphere and, particularly, scattering and absorption spectra that can be changed through manipulation of the NP's surroundings to change a plasmon resonance or resonances. However, asymmetric NPs generally have more than one dipole resonance that affects the emission spectrum. For example, a prolate spheroid NP would have resonances along both its major and minor axes. Also, higher order resonances are possible, e.g. quadrupole, octopole, etc are possible in any NP, spherical or asymmetric. For simplicity, the following often assumes NPs having a single resonance that is relevant to the emission spectrum, but generally, the NPs may be asymmetric or otherwise have multiple resonances.

Figure 1:
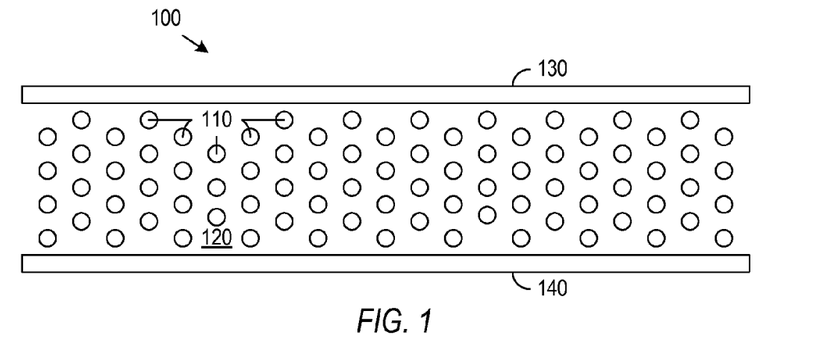
FIG. 1 shows a color tunable structure in accordance with an embodiment of the invention that alters the refractive index of a medium surrounding a collection of particles to change the resonance frequency of scattering or absorption of the particles.

One embodiment of the invention illustrated in FIG. 1 provides a color tunable structure 100 containing NPs 110 in a medium 120 between a front plate 130 and a back plate 140. NPs 110 can be dispersed in medium 120, which can be a liquid or a solid, or held in place, e.g., by some attachment to plates 130 or 140. Each NP 110 as described above can be a metal particle or other particle structure having an optical scattering or absorption spectrum that depends on the dielectric properties of medium 120.

Medium 120 is a material having dielectric properties that can be changed through application of an external stimulus. In an exemplary embodiment described further herein, material 120 is a non-absorbing or weakly absorbing liquid crystal, but medium 120 could alternatively be a different electro-optic material having a refractive index that depends on an applied electric field or a material with refractive properties that depend on other external stimuli. In this exemplary embodiment where material 120 is an electro-optic material, color tunable structure 100 can continuously change color in response to continuous changes in a voltage applied between plates 130 and 140. In particular, the voltage difference between plates 130 and 140 can vary the refractive indices of medium 120 across a continuous range, which consequently continuously varies the frequency of the plasmon resonances and therefore the optical spectra for scattering or absorption by NPs 110. Alternatively, an applied voltage can change the apparent color of structure 100 in discrete steps, for example, when the refractive index of medium 120 does not change continuously with bias voltage. For example, the applied bias voltage reaching a critical electric field may cause material 120 to undergo a phase transition from an ordered state with one refractive index to another ordered state with another refractive index.

As an alternative to using an electro-optic material for medium 120, other material types can be used to change the dielectric properties surrounding NPs 110. For example, the dielectric properties of medium 120 surrounding NPs 110 can be changed by introducing or removing solutions with different refractive indices. In particular, NPs 110 can be attached to fixed structures (not shown) or to plate 130 or 140, and a liquid with a given refractive index can be reversibly swept over NPs 110, for example, via electro-wetting. Electro-wetting techniques are known in the art, and described for example by R. A. Hayes and B. J. Feenstra, Nature 425, 383 (2003) and Prins et al., Science 291, 277 (2001). Alternatively, a reversible flow of liquid to alter medium 120 can be driven mechanically, e.g., with capacitively-actuated diaphragms or piezoelectrics (not shown) or thermally, e.g., by vaporizing liquid or expanding gas. Electro-wetting can provide near continuous color variation corresponding to a range of partial wetting of NPs 100 or a binary color change corresponding to whether wetting fluid covers NPs 110 or not.

Front plate 130 is typically transparent for transmission of light incident on, reflected from, or passing through a display and can be based on a transparent conductive material such as indium tin oxide (ITO) or other transparent metal oxides such as tin oxide for embodiments of the invention that alter the dielectric properties of medium 120 by applying voltages to plates 130 and 140. In alternative configurations of color tunable structure 100, back plate 140 can be reflective, white, transparent, or black (absorptive). When back plate 140 is reflective, white, or transparent and back lit, color tunable structure 100 can provide subtractive color by absorbing light having frequencies primarily near the plasmon resonance frequency of NPs 110. When back plate 140 is black or absorptive, light scattered by the NPs gives color-tunable structure 100 its color. In either case, the perceived color of color tunable NPs 110 changes with a change in the refractive index of medium 120.

The choice of material 120 can affect the viewing angles at which color tunable structure 100 provides a desired color. In particular, for an anisotropic medium 120 the induced plasmon resonance depends on the dielectric properties of medium 120 surrounding NPs 110 relative to the direction of the incident light's electric field. If electro-optic material 120 is a liquid crystal, the dielectric properties are anisotropic, which impacts the absorption or scattering curves according to the range of angles and polarizations of the incident light. If necessary, this angular and polarization dependence may be mitigated using polarizing filters or an optical element or aperture that limits the range of accepted polarizations or angles of incidence for the incoming light.

Endurance of color tunable structure 100 can be quite high if a liquid crystal is used for material 120. Further, NPs 110, which may be predominantly metal, can also be quite robust and provide a long useful life. Ligands, which may be used in some embodiments to make NPs 110 dispersible in a fluid, e.g., media 120, or to provide the proper charge for electrophoretic approaches to move NPs 110, may also aid the longevity of color tunable structures 100 by slowing oxidation or other chemical reactions that might otherwise alter NPs 110.

Another mechanism for tuning the color of NPs is to move the NPs from a region with one refractive index to a region with a different refractive index. One way to accomplish this is by moving NPs in a fluid, i.e., a gas or a liquid, that has dielectric properties that differ significantly from the properties of a fixed structure such as a metal or dielectric film or one or more walls of a container holding the fluid. Moving the NPs toward or away from a wall, film, or other structure can significantly change the effective dielectric properties surrounding the NPs when the wall, film, or structure has a refractive index that differs from that of the fluid or has a plasmon resonance to which plasmons in the NPs can couple. This change in dielectric properties can lead to a substantial shift in the absorbed or scattered optical spectra of the NPs, even though the distance moved by the NPs can be small. The small motion required allows for fast color switching, which is necessary for video displays. For example, for metal spheres, the plasmon resonance is most strongly impacted by the surrounding medium within a few diameters of the sphere. Accordingly, motion on the order of a few particle diameters is enough to tune the color. Because the NPs can be quite small (nm scale), the required motion is over very small distances and can be sufficiently fast used in video displays.

Figure 2A:
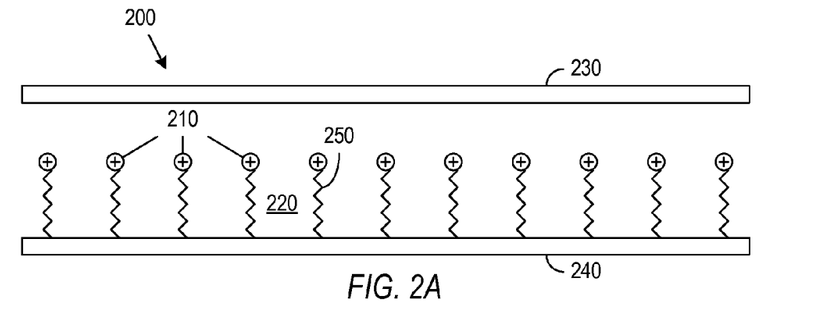
FIGS. 2A, 2B, 2C, and 2D illustrate color tunable structures in accordance with embodiments of the invention that alter separation of particles from a film and/or each other to alter the optical spectrum of scattering or absorption of the particles.

FIG. 2A illustrates a color-tunable structure 200 in which NPs 210 are in a fluid medium 220 and attached to structure such as a front plate 230 or a back plate 240 of a compartment containing fluid medium 220. As a specific example for illustrative purposes, the following describes the case where NPs 210 are attached to back plate 240 and back plate 240 includes metal film having plasmons capable of coupling to plasmons in NPs 210. In an alternative embodiment, back plate 240 contain a material with a refractive index that differs significantly from that of medium 220. Back plate 240 may, for example, contain a high index material such as $TiO_2$, which has a refractive index much greater than most fluids.

Structures 250 such as ligands, molecular or polymeric tethers, or dendrimers can be used to tether NPs 210 in a manner that still allows NPs 210 to be driven toward or away from plate 240. This tethering can be accomplished, for example, through use of ligands that are functionalized at one end to attach to a metal film (e.g., a thiol or amine to attach to a gold film) on plate 240 and functionalized at the other end to attach to NPs 210 (e.g., another thiol or amine).

NPs 210 can be charged through a combination of proper choice of NP material, the ligands on NPs 210, a solution constituting the media 220 in which NPs 210 are immersed (if media 220 is a liquid), and additional charge control agents or charge directors in the solution or on NPs 210. For example, ligands on NPs 210 can contain a carboxylic group that can be dissociated in polar solutions to leave a net charge on NPs 210. Alternatively, a surfactant or charging agent such as OLOA or AOT can be used to form inversed micelles in non-polar solutions that enable charging of NPs 210. Other techniques for holding charge on NPs 210 could also be used. Alternatively, portions of tethers 250 can be functionalized to contain species that can be charged, so that an electric field applied via the plates 230 and 240 to these charges on tethers 250 can cause tethers 250 to bend or fold.

Figure 2B:
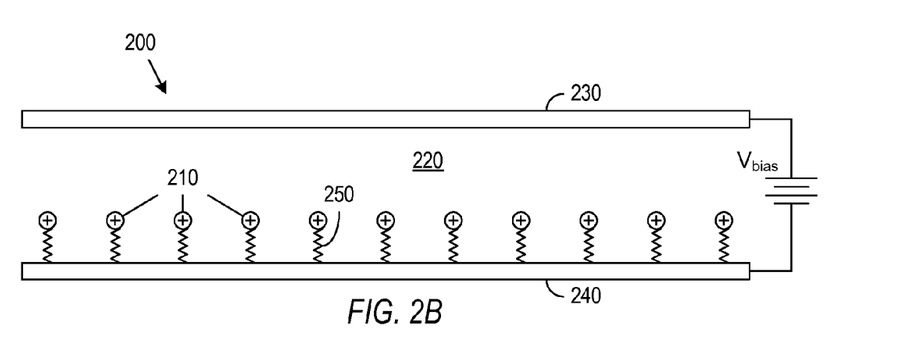
Figure 2C:
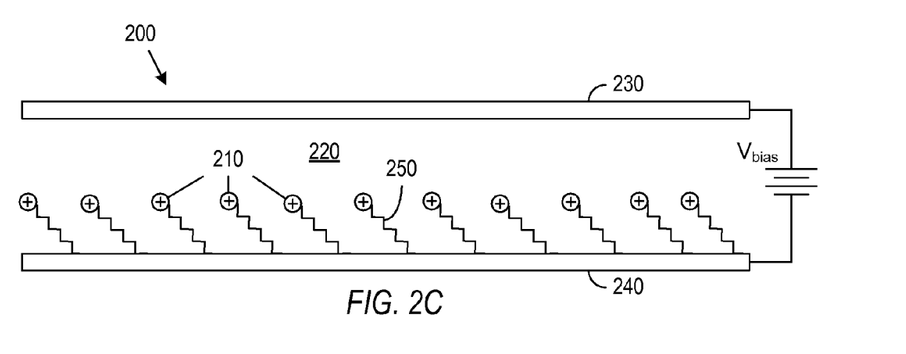

FIG. 2A shows the color tunable structure 200 with NPs 210 being positively charged but with no applied bias voltage. With this configuration, a negative bias voltage $V_{bias}$ applied to film or plate 240 pulls the positively charged NPs 210 closer to back plate 240 and can compress tethers 250 as shown in FIG. 2B. Alternatively, if tethers 250 are stiffer, bias voltage $V_{bias}$ may bend tethers 250, which also brings NPs 210 toward back plate 240 as shown in FIG. 2C. In either case, moving NPs 210 closer to back plate 240 effectively changes the dielectric properties of the surroundings of NPs 210 and changes the color of color-tunable structure 200 by altering the plasmon resonance of NPs 210.

A movement on a scale corresponding to a few times the size of an NP 210, e.g., on the order of hundreds of nanometers, can change the dielectric properties of the surroundings of NPs 210 sufficiently to significantly change the spectral resonance of NPs 210. The change in the spectral response is not always a simple shift of the resonance. Other "coupled" plasmon modes can occur when NPs 210 are brought into close proximity with each other or back plate 240. However, in general, a redshift of the primary resonance peak that can be a significant fraction of the visible spectrum can be produced through changes in the dielectric properties of the surroundings of NPs 210. See, for example, U. Kreibig and L. Genzel, Surf. Sci. 156, 678 (1985); J. P. Wilcoxon, et al., Phys. Rev. A 39, 2675 (1989); T. Jensen, et al., Journal of Cluster Science, 10, (1999). The amount of movement of NPs 210 required to change the color of structure 200 can thus be much less than required in paper-like display systems that move dye particles between front and back positions of the display. As a result, embodiments of color tunable structure 200 can be much faster than some prior paper-like display structures and can switch at video rates without requiring unacceptable currents or power consumption.

Electric fields created via the plates 230 and 240 can change spectral response of NPs 210 as described above by bending or folding tethers 250 through the action of the electric fields on charged NPs 210 or on portions of tethers 250 functionalized to contain charged species. Alternatively, the presence or absence of a fluid or fluid constituent can be used to change the conformation of tethers 210 thereby changing the distance between the NPs 210 and a metal film or structure. For example, tethers 250 may contract or expand depending on changes in the hydrophobicity of the fluid in which they are immersed.

In an alternative embodiment, NPs 210 don't necessarily need to be tethered. NPs 210 could instead be moved toward or away from plate 240 electrophoretically so as to control the coupling between NPs 210 and the dielectric properties of a metal or dielectric film or a particle array on the wall 240, and thereby the optical spectra of both. This sort of control of the plasmon resonances has the advantage that the potential of one of the interacting objects, i.e., the fixed film or particle array, can be directly controlled by applying a bias voltage or another external stimulus. This makes it easier to overcome effects such as sticking of particles to the film via attractive forces such as van der Waals forces.

Figure 2D:
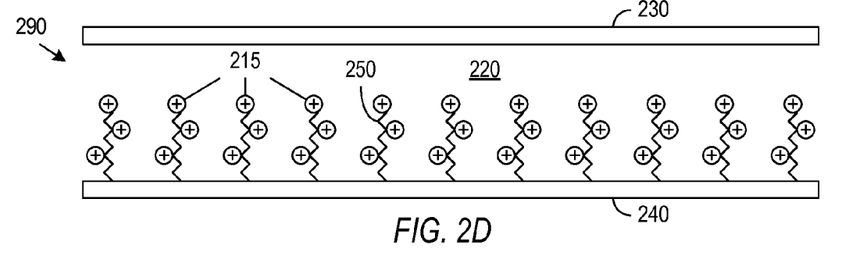

Spectral changes can also be affected via changes in the separation or spacing of nanoscale particles. FIG. 2D, for example, shows a color tunable structure 290 having multiple particles 215 attached to each tether 250. The particles 215 on each tether 250 may be identical or may differ of different types. For example, some particles 215 may NPs that differ in size or composition and therefore have different plasmon resonances, may be dielectric particles that lack plasmon resonances, and may or may not be treated to hold charge. In one embodiment, all of particles 215 have plasmon resonances that may couple with resonances in other particles 215. In an alternative embodiment, some particles 215 have plasmon resonances, and other particles 215 are dielectric particles (e.g., $TiO_2$ particles) having dielectric constants that differ from the dielectric constant of fluid 220. In either case, contraction or folding of tethers 250 decreases the spacing between particles 215 and either increases the coupling of plasmon modes between particles 215 or otherwise changes the surrounding dielectric properties and absorption and scattering spectra of the particles 215 having plasmon resonances.

Figure 3:
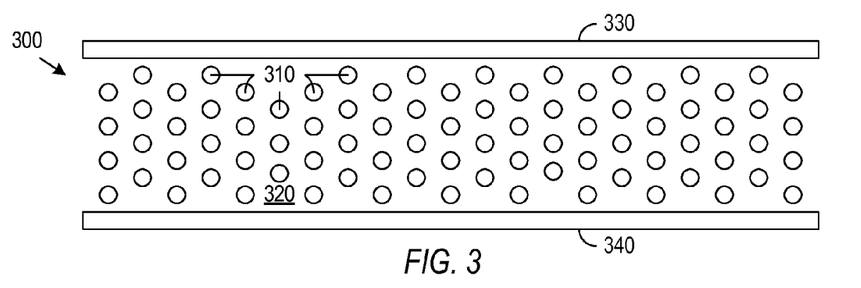
FIG. 3 illustrates a color tunable structure in accordance with an embodiment of the invention that alters the optical spectra of particles in a three-dimensional arrangement by changing their spacing relative to each other.

The optical spectra of the untethered NPs can also be tuned through control of the spacing of the NPs. FIG. 3, for example, illustrates a color tunable structure 300 in which NPs 310 are untethered but in an arrangement that can be altered to change the spacing of NPs 310. In one such embodiment, NPs 310 are embedded in a material 320 that is a compliant solid material that changes shape or size in response to an external stimulus such as an electric or magnetic field, heat, or light. Examples of such materials 320 include: electro-active or piezoelectric polymers that stretch or shrink in an electric field; hydrogels or other materials that swell upon introduction of another species such as electro-active ionic polymers; photoactive materials such as photoactive polymers that orient or change size under exposure to light; and thermoactive materials such as thermoactive polymers that change their morphology with the application of thermal energy.

Another method for altering the spacing of NPs 310 is to apply a mechanical force or pressure that alters the shape of compliant material 320. For example, applying a bias voltage between electrodes 330 and 340 creates an attractive force that can decrease the spacing between electrodes 330 and 340 and compresses material 320, bringing NPs 310 closer together. Alternatively, the fluid pressure surrounding compliant material 320 can be increased or decreased to cause material 320 to contract or expand and thereby change the spacing between NPs 310. Possibilities for the compressible material 320 in this embodiment include soft aerogels or sponge-like polymers. Another possibility is to coat NPs 310 with a compressible material such as an alkyl ligand, oligomer, or polymer. This would create something akin to "NP hair balls" that could be stacked together and reversibly compressed by an external actuator such as an electrostatically driven diaphragm, or piezoelectric or thermally driven actuator attached to plate 330 or 340.

The spacing of NPs 310 can in general be changed along one or more axes. In any of these cases, when NPs 310 are closer together, plasmons in adjacent NPs 310 have a stronger coupling to each other, which generally shifts the frequency of the plasmon resonance of NPs 310 and also leads to additional plasmon oscillation modes. As a rule of thumb, collective resonances begin to occur when the separation between NPs 310 is on the order of the size (or a few times the size) of NPs 310. This generally sets the scale for the degree of control over the separation of NP 310 that is required to tune optical properties of color tunable structure 300.

Figure 4:
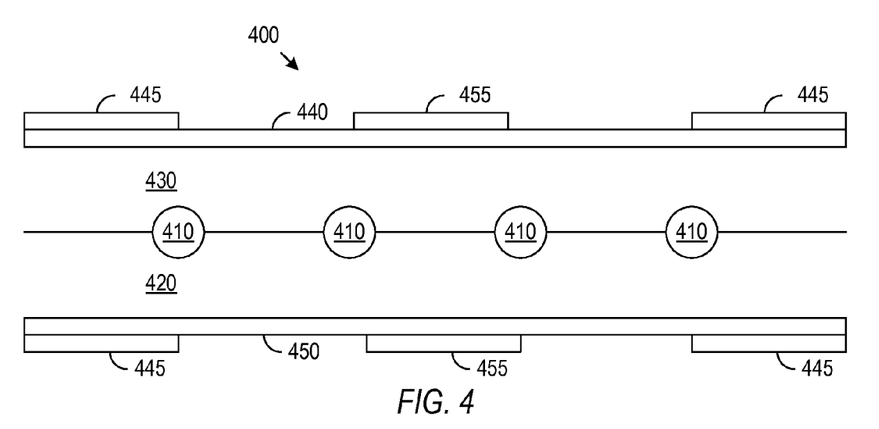
FIG. 4 illustrates a color tunable structure in accordance with an embodiment of the invention using particles confined at an interface between two fluids.

FIG. 4 shows a color tunable structure 400 having NPs 410 that are confined to two dimensions at the interface between two immiscible fluids 420 and 430 in which the NPs 410 are not dispersible, e.g., between immiscible liquids 420 and 430 or a liquid 420 in which NPs 410 are immiscible and a gas 430. In one specific embodiment, NPs 410 are coated with ligands that are functionalized to retain a charge in fluid 420 or 430. This charging may or may not be aided by the use of charge directors or charge control agents. The ligands can be further chosen to make NPs 410 non-dispersible in fluids 420 or 430. For example, NPs 410 can be coated with hydrophobic ligands, and fluid 420 can then be water containing the charged and hydrophobic NPs 410. In this case, NPs 410 segregate on the surface of fluid 420 as a result of their hydrophobicity. AC or DC biases can be applied to electrodes 445 and 455 on plates 440 and 450 to change the separations of NPs 410. In particular, a DC voltage can be used to push NPs 410 toward or away from a central area of color tunable structure 400, while an AC component of the applied voltage can improve the uniformity of the distribution of NPs 410 confined to an area of the fluid interface.

Additional species could be added and removed from a fluid 420 or 430 if desired to control the aggregation of NPs 410. This can be accomplished, for example, by changing the pH of the solution by adding or removing hydrogen ions, adding or subtracting solvents with different degrees of polarity, polarizability or hydrogen bonding, or adding other species that cause NPs 410 to aggregate or disaggregate. (These aggregation techniques can also be used with NPs that are dispersible in a fluid in embodiments of the invention using only one fluid.)

Figure 5A:
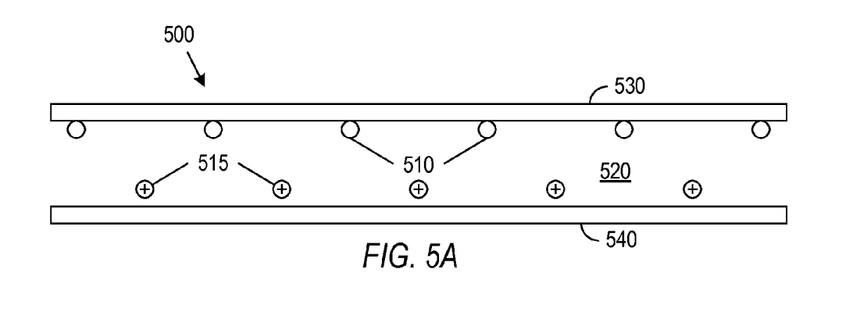
FIGS. 5A and 5B illustrate a color tunable structure in accordance with an embodiment of the invention employing fixed and movable particles.
Figure 5B:
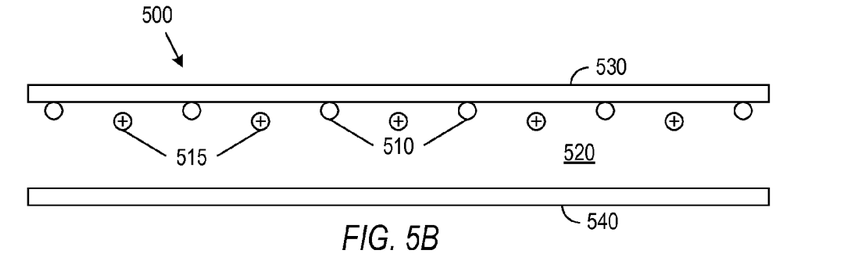

FIGS. 5A and 5B illustrate a color tunable structure 500 in accordance with an embodiment of the invention that tunes color by controlling the spacing between particles 510 that are attached to a fixed structure such as a front plate 530 and particles 515 that are free to move in a fluid 520 confined between plates 530 and 540. Particles 510 and 515 can be substantially identical or can be different kinds of particles. For example, attached particles 510 can be NPs with plasmon resonances that are tunable for scattering or absorption of visible light, and particles 515 can be NPs with tunable plasmon resonances or any type of particle having dielectric properties that differ from those of fluid 520 sufficiently to change the dielectric properties of the surroundings of NPs 510 when they are in close proximity to NPs 510. Alternatively, the roles of particles 510 and 515 could be reversed.

FIG. 5A shows the configuration where fixed particles 510 are NPs having a first spectral response when particles 515 are dispersed in fluid 520 and therefore are relatively distant from particles 510. Particles 515 can be charged using the techniques described above, so that an electric field applied via plates 530 and 540 forces particles 515 nearer to particles 510 as shown in FIG. 5B. Particles 515 being in close proximity to particles 510 change the dielectric properties of the surroundings of particles 510, resulting in a change in the plasmon resonance or resonances and the color of pixel structure 500.

In one exemplary embodiment, particles 510 are metal particles with plasmon resonances and are attached to an ITO-coated glass front plate 530, and particles 515 contain a high refractive index material such as $TiO_2$. Rutile $TiO_2$ has a large index of refraction, i.e., about 2.7 in the visible range, and control of electrophoretic movement of $TiO_2$ is well known in some current paper-like displays that use $TiO_2$ as an electronic dye. For further control of the optical properties of color tunable structure 500, particles 515 made of $TiO_2$ or other dielectric materials can be made sufficiently small that structure 500 is transparent when particles 515 are dispersed in fluid 520, but such particles 515 when collected or concentrated in an area, for example, on plate 540, become opaque or reflective. Accordingly, electrophoretic movement of particles 515 can be used to change structure 500 from a transparent state (e.g., where the plasmon resonances of particles 510 are outside the visible spectrum) to a color state corresponding to the spectra of particles 510 when particles 515 change the dielectric properties of the surroundings of particles 510. Particles 515 can also provide an opaque or reflective layer when collected on a surface (e.g., on plate 530 or 540).

The spacing between NPs and other particles in arrangements such as described above can be controlled electrophoretically. The charge or zeta potential on the NPs or other particles in general can be controlled through the proper choice of material, surface preparation (e.g., the choice of surface ligand), and chemical properties of the liquid or gas in which particles are contained. Additional charge transfer agents may be incorporated into a liquid or gas to help control the charge state and mobility of the particles in the fluid. Electrodes can then be used to produce a DC or AC (or combination of both) electric field that alters the separation and distribution of the particles. For example, a strong DC field could be used to force charged NPs into close proximity near one of the electrodes. An AC field could be used to distribute the NPs more uniformly between the electrodes.

Figure 6A:
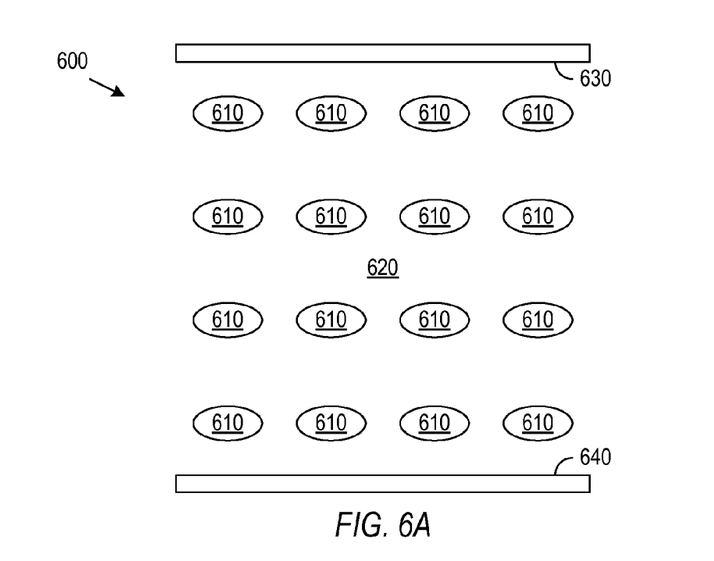
FIGS. 6A and 6B illustrate a color tunable structure in accordance with an embodiment of the invention that alters the effective optical spectra of non-spherical particles by changing their orientation relative to each other.
Figure 6B:
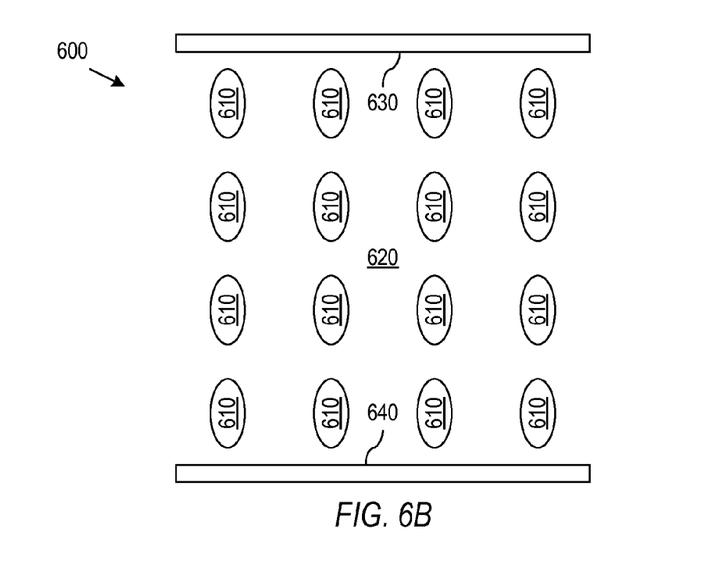

FIGS. 6A and 6B illustrate color tunable structure 600 having a color tuning mechanism that uses rotation of non-spherical NPs 610 to change the effective plasmon resonance of NPs 610. In the illustrated embodiment, NPs 610 are ellipsoidal and have scattering or absorption cross-sections that depend on the direction of the incident light. Accordingly, as the orientations of NPs 610 change continuously from the configuration of FIG. 6A to the configuration of FIG. 6B, the spectral response of NPs 610 changes continuously and enables tuning of the apparent color of structure 600 across a range of colors. The change in orientation of NPs 630 can simultaneously result in a change in the spacing of NPs 610, which also causes a change in the plasmon resonances of NPs 610 and the resulting color of structure 600.

The orientation of NPs 610 can be changed using a variety of techniques. For example, in one embodiment, NPs 610 are surrounded by a material 620 that is able to change the orientations of NPs 610 in response to an external stimulus. For example, if material 620 includes suitable liquid crystal (LC) molecules, application of an electric field can cause a change in state of LC molecules that changes the relative positions or orientations of NPs 610. In particular, a rotation of LC molecules 620 can, through stearic effects or electrostatic interactions, cause a rotation of NPs 610. This is similar to the use of LC molecules to rotate dye molecules in so-called "guest-host" systems, a process that is well known in the art. NPs 610 can alternatively be given a dipole moment through asymmetric application of charging agents, so that the application of a voltage between plates 630 and 640 causes NPs 610 to rotate from the orientation of FIG. 6A to the orientation of FIG. 6B. A similar technique is to use an electric field to orient particles with anisotropic polarizability. Application of a field can also induce phase segregation of the NPs 610 from LC molecules (or other molecules with a dipole moment that do not exhibit crystalline order). These changes in orientation and position alter both the NP spacing and the dielectric properties of the medium surrounding the NPs 610, thereby modifying the optical spectra of NPs 610.

In general, neither NPs 610 nor the surrounding molecules need be ordered as shown in FIGS. 6A and 6B. Either could be amorphous or exhibit different spatial ordering. For example, NPs 610 can be relatively miscible in a liquid crystal or phase-segregated from a liquid crystal.

Various combinations of the above techniques can be incorporated into a single color tunable structure. For example, if opposite walls of a color-tunable structure contain materials with very different indices of refraction (or indices much different than the fluid in which the NPs are dispersed) then driving the NPs toward or away from these walls can shift the plasmon resonance of the NPs through both aggregation effects and proximity to the walls. Alternatively, one or more walls can include a metal film or metal structures that exhibit a plasmon resonance and coupling between the NPs and this film can be used in conjunction with aggregation of the NPs or changes in the refractive index around the NPs. Yet another possibility is to use electrophoretic or electrowetting techniques in combination with controlled aggregation to both tune the optical spectra of the NPs and remove them from view when necessary.

Figure 7A:
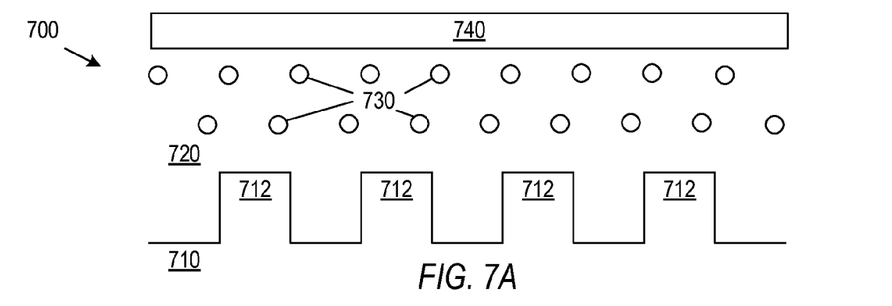
FIGS. 7A, 7B, 7C, and 7D illustrate color tunable structures in accordance with embodiments of the invention employing movable particles and shaped surfaces having discrete structures of features with plasmon resonances.
Figure 7B:
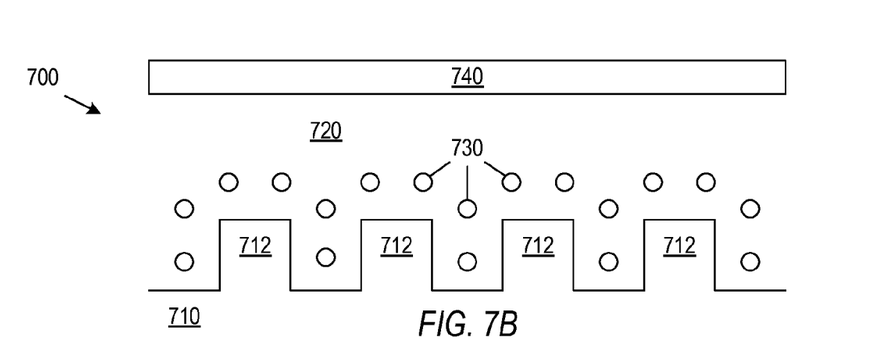

The ability to tune the color of structures described above in regard to NPs can also be applied to other discrete structures that define or limit available plasmon modes. In particular, a continuous metal surface may be shaped to have features with plasmon modes that are substantially defined by the features, and the plasmon resonances of such features can be tuned to desired wavelengths using many of the above-described techniques. FIGS. 7A and 7B, for example, illustrates a color tunable structure 700 including a plate or film 710 having a surface that is contoured to create a set of features 712 on film 710. Film 710 may be a shaped metal film or a composite film, for example, in which metal columns form discrete features 712 on a glass plate. Features 712 may have a typical height and width of about a few nanometers to a few hundred nanometers and separations of about a few nanometers to a few hundred nanometers. Features 712 in plan view (not shown) may be in a two-dimensional array of bumps and may in general have any contour, e.g., flat topped as in FIG. 7A, provided that features 712 define boundaries for plasmon modes/resonances. For example, such plasmon modes may be spatially localized within features 712 or the portions of film 710 between features. The frequencies of these plasmon modes or resonances will generally depend on the dimensions of regions of surface 710 in which the modes are confined and on the dielectric properties of the surroundings of surface 710.

Color tunable structure 700 includes a fluid 720 and particles 730 that can be moved to alter the dielectric properties of the surroundings of film 710. Particles 730 can be particles having dielectric properties that differ from those of fluid 720 (e.g., particles of $TiO_2$ in isopar) or may be NPs having plasmon resonances capable of coupling to the discrete plasmon resonances of surface 730. To tune the color of structure 700, particles 730 can be continuously moved to change the average separation between features 712 and particles 730 or the concentration of particles around features 712. For example, FIG. 7A shows a state of structure 700 where particles 730 are away from features 712, and FIG. 7B shows a state structure 700 where particles 730 are close to features 712. The techniques described above, for example, electrophoretic techniques using a charging agent on particles 730 and an electric field created by an applied voltage difference between plates 710 and 740, can move particles 730 between the states of FIGS. 7A and 7B and intermediate states corresponding to a range of separations. Additionally, when particles 730 made of dielectric material, e.g., $TiO_2$, particles 730 can be switched from a dispersed and transparent state to a state when particles are sufficiently concentrated to be opaque or reflective.

Figure 7C:
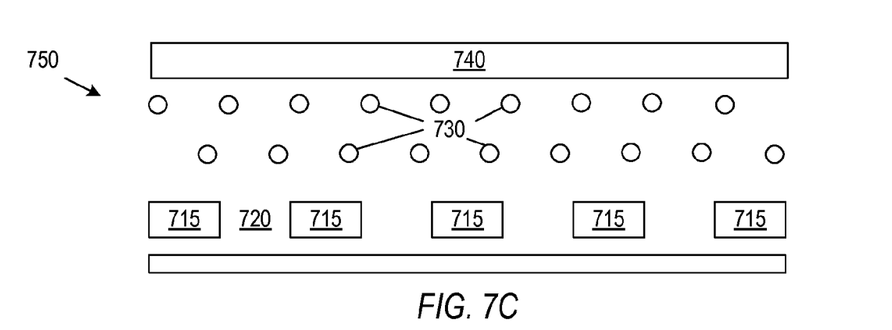
Figure 7D:
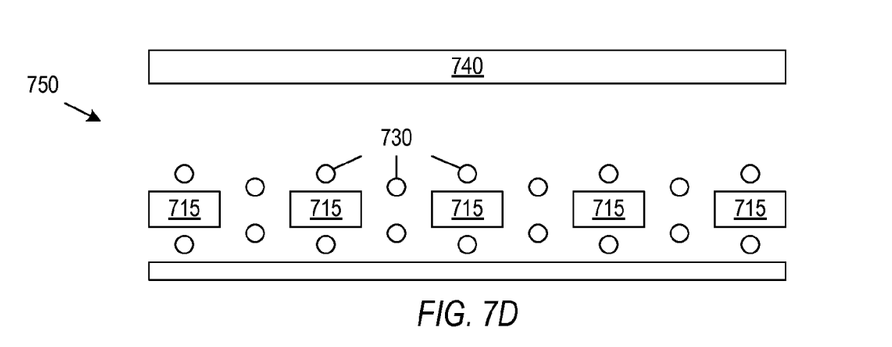

FIGS. 7C and 7D illustrate a color tunable structure 750 that can use the same color tuning mechanisms as in color tunable structure 700 of FIGS. 7A and 7B, but in place of film 710 having contoured features 712, color tunable structure 750 uses a continuous metal or composite film 715 having a set of holes that leave film 715 with a net-like structure. A similar net-like structure can be created using depressions in film 715, where the depressions do not go all the way through film 715. The plasmon resonances and resulting optical scattering and absorption from film 715 will in general depend on the spacing, size, and shape of the holes (or depressions) in film 715, as well as the dielectric properties of film 715 and its surroundings. To tune the color of structure 750, particles 730 can be moved away from film 715 or closer to film 715 or even into the holes in the film 715, thereby changing the dielectric properties of the surroundings of film 715.

The dielectric property, spacing, and orientation control techniques for color tuning as described above using NPs can also be used in embodiments using discrete features on continuous structures. For example, a color tunable structure 700 or 750 of FIG. 7A or 7C can employ a material 720 having a refractive index that can be changed through application of an external stimulus as described above with reference to FIG. 1.

An advantage of color tunable structures 700 and 750, which include films 710 and 715 that are shaped to create discrete features, is the ability to alter the index of refraction in a greater volume around the resonant structure, when compared, for example, to a system using plasmon resonances in a large flat films. The ability to alter a greater portion of the surroundings can lead to larger shifts in the optical spectra of discrete features 712 or 715. Another possible advantage over flatter features is a greater cross-section for scattering or absorbing in thicker structures, which could lead to better color contrast.

The spectral characteristics of the plasmon resonances of NPs or other discrete features in the above-described color tunable structures can be selected according to the desired effect or use of the color tunable structure. For example, in a display pixel structure using additive color as described further below, a relatively narrow resonance is preferred. How narrow generally depends on which color is being created and how saturated the color needs to be. To get a highly saturated blue, one would want to scatter blue light in a range about 30 nm. For red, a 50 nm scattering band would provide fairly saturated color. On the other hand, a narrow band may not be optimal in a display pixel using "subtractive" color. For instance, a display pixel using subtractive color to display red may need to absorb the entire visible spectrum except for red. To get green, with subtractive color requires absorbing all the blue and red (i.e., 2 bands). A wide resonance width (e.g., about equal to wavelength range of visible light or other light to be gated) would be desired if a color tunable structure is used as an electronically-controlled shutter or reflector.

The width of a plasmon resonance of an NP or other discrete feature generally depends on the band structure of the constituent material or materials, so that a desired width may be achieved in a color tunable structure through selection of an appropriate material for the desired application of the color tunable structure. Composite structures can also be used to engineer the width of the plasmon resonance. For example, it has been shown that the resonance of solid metal spheres can be narrowed by replacing the core of the sphere with a dielectric material. See, for example, J. Flintermann, G. Schatz, and K. Shuford, Nanoscape 3, 29 (2006). Alternatively, a desired resonance width can be achieved through mixing of NPs or features of different sizes, shapes, or composition. Similarly, the relative magnitudes for scattering and absorption can be adjusted through control of feature size because in general, absorption will dominate in small features and NPs while scattering dominates in larger features and NPs. Other characteristics of the tunable structures can similarly be controlled or altered through selection of the size, materials, or mixtures of NPs or other discrete features used.

Any of the color-tunable structures described above may be used as an electronically-controlled shutter or reflector. High contrast in such a reflector or shutter can be produced using the above tunable structures with NPs containing a material (such as a rhodium/aluminum bilayer) having a very broad plasmon resonance. For a shutter, the tunable structure can be tuned to absorb or scatter a broad band of light covering the visible spectrum to provide a black or white opaque state. For an electronically controlled reflector, the tunable structure can be tuned to reflect a broad band of light covering all or most of the visible spectrum. In either case, the tuning can shift the resonance peak outside the visible spectrum for a transparent state corresponding to low absorption, scattering, and/or reflectivity for visible light.

The ability to tune the absorption and/or scattering spectra of the optically active material in a reflective display provides large advantages in terms of architectural simplicity, manufacturing cost, and achievable brightness and contrast in a display. In particular, a color tunable structure that uses scattering to provide apparent color of a pixel can be tuned to produce spectral colors. For example, if the color tunable structure scattered light in a narrow range that was tunable throughout the visible spectrum then the structure could create the hues corresponding to spectral colors, which corresponds to a curve near the border of a conventional chromaticity diagram. This limit range of hues would be adequate for some applications. On the other hand, if the tuning can be accomplished at rates that are fast relative to the response of the human eye then the perception of any hue within the conventional chromaticity diagram could be created by rapidly dithering the optical response of the active material along the curve. Side-by-side architectures can produce and sustain the color hues perceivable by humans through a combination of two color-tunable sub-pixels, as explained further below. In contrast, conventional color pixel structures require three sub-pixels (e.g., RGB) that are separately control to produce colors. In addition, the ability to tune the absorption and/or scattering out of the visible range allows the optically active material to be placed in a transparent state. This allows the use of stacked geometries having fewer layers that required in conventional stacked pixel architectures.

Figure 8A:
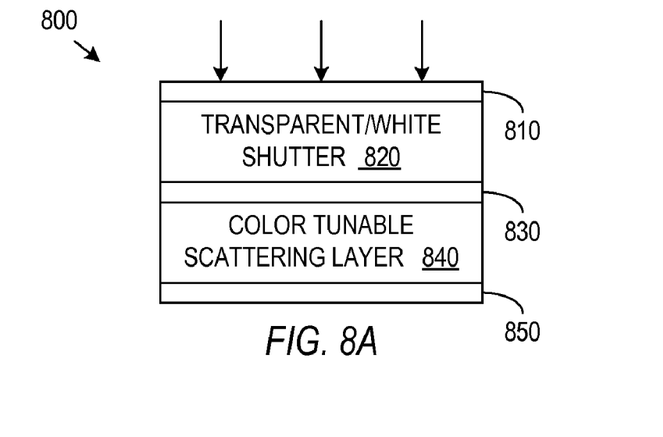
FIG. 8A illustrates a pixel structure containing a single color-tunable layer in accordance with an embodiment of the invention.

FIG. 8A shows a pixel structure 800 that employs a color tunable structure for display of a color pixel, for example, as part of a still image or a frame of video. An array of similar pixel structures 800 can be fabricated as part of a paper-like monitor, television, or other display. Pixel structure 800 includes transparent plates 810 and 830, a shutter 820, a color-tunable scattering layer 840, and absorptive/black back plate 850.

Shutter 820 is a transparent/white shutter (with intermediate levels) that allows control (but not independent control) of the color hue and brightness of the pixel structure 800. This control is achieved by changing the fraction of incident white light that is reflected at the shutter 820. Increasing the reflection of the shutter also decreases the fraction of light scattered by the color tunable medium 840. Through a combination of changing the fraction of white light reflected by the shutter 820 and tuning the wavelength range of light reflected by the medium 840, a large portion of the human color gamut can be accessed with a single pixel structure. Shutter 820 can be implemented using a broad-band color tunable structure such as described above. In particular, shutter 820 can be implemented as a color tunable structure having a plasmon resonance that is wide enough to scatter frequencies of light corresponding to all or a significant portion of the visible spectrum and having sufficient tuning range that the plasmon resonance can be shifted out of the visible spectrum. Alternatively, shutter 820 can be implemented using liquid crystals, electrophoretic, electrowetting, or even mechanical technologies, or other conventional technologies.

Color tunable layer 840 can use any of the above described principles and embodiments for tuning plasmon resonances and controlling the color of layer 840. In pixel structure 800, color tunable layer 840 is preferably optimized for scattering light. Further, color tunable layer 840 preferably has a tunable plasmon resonance that can be tuned across a range of light wavelengths extending over the visible range and beyond to a resonance frequency that is not visible to the human eye, i.e., to an infrared or ultraviolet wavelength.

Figure 8B:
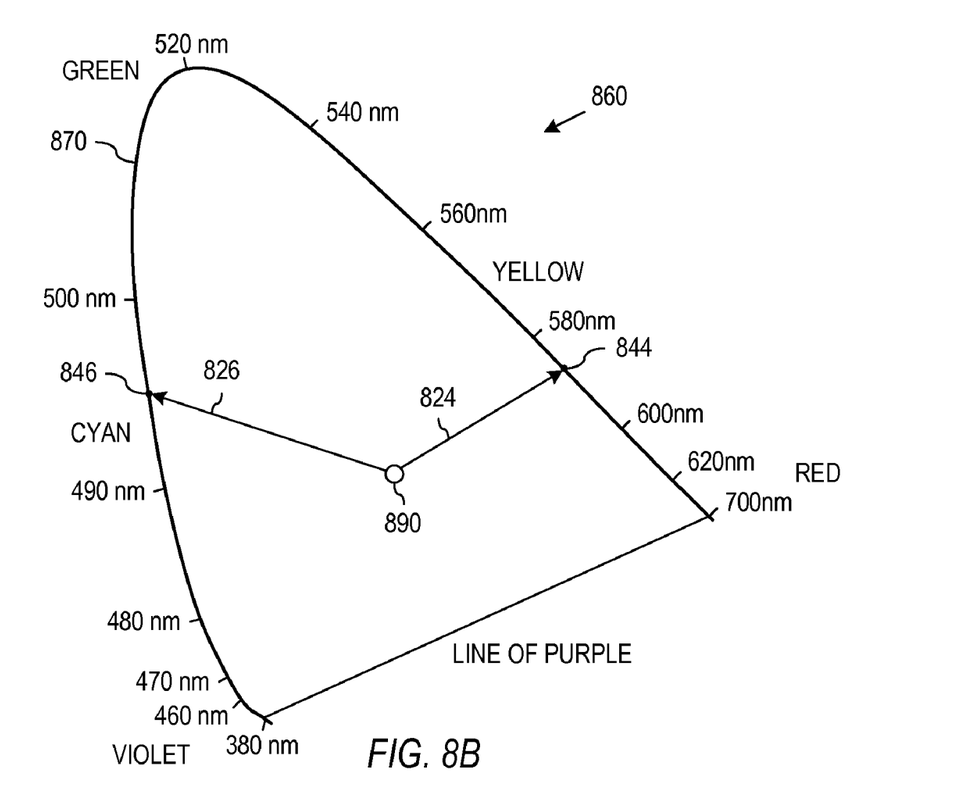
FIG. 8B is a chromaticity diagram illustrating the color performance of the pixel structure of FIG. 8A.

Pixel structure 800 is reflective and during operation receives incident white light through the front transparent plate 810. Shutter 820, color tunable layer 840, and back plate 850 absorb or scatter portions of the incident light to generate the apparent color of pixel structure 800. FIG. 8B shows a chromaticity diagram 860 that illustrates the operation of pixel 800 to display different colors. In diagram 860, each point along the horseshoe-shaped border 870 corresponds to the color hue perceived by humans when viewing light of a single wavelength within the visible spectrum from about 380 nm to about 700 nm. Points in the interior of the diagram represent color hues perceived when light with a mixture of wavelengths is observed. For example, mixing light of two wavelengths in varying ratios produces the hues along a line segment in the diagram connecting the points on the border 870 corresponding to those two wavelengths. In particular, a point 890 is perceived as white, which may be produced, for example, when seeing a mixture of all visible light frequencies or a mixture of complementary colors. Color tunable layer 820 is preferably tunable to have a narrow scattering resonance peaked at a frequency corresponding to any of the spectral colors on border 870.

Pixel structure 800 operates shutter 820 in its most reflective or white state when displaying the color white. In this state, pixel structure 800 simply scatters incident white light, and the tuning of scattering layer 840 doesn't affect the color of pixel structure 800. In contrast, when shutter 820 is fully transparent, scattering layer 840 can be tuned to scatter light of spectral colors corresponding to points on border 870 for display of any desired spectral color, i.e., any color on border 870 of chromaticity diagram 860. In practice, the color of pixel structure 800 will differ somewhat from a pure spectral color even when shutter 820 is fully transparent because of the finite width of the plasmon resonance of color tunable 840. However, good saturation of spectral colors can be achieved with a narrow resonance and large plasmon resonance peak.

Pixel structure 800 operates shutter 820 in a partially transparent state when displaying colors other than white or a spectral color. For example, tunable scattering structure 840 may be tuned to have a scattering resonance corresponding to a point 844, which is between wavelengths 580 nm and 600 nm in FIG. 8B. As described above, when shutter 820 is fully reflective, pixel structure 800 will be white as a result of scattering of the incident white light. As shutter 820 becomes partially transparent, some of the incident light is scattered at shutter 820 and some of the incident light reaches tunable scattering layer 840. From the light transmitted through shutter 820, color tunable structure 840 effectively scatters light near the resonance frequency (and no others), and absorptive layer 850 absorbs the frequency not scattered in tunable structure 840. As a result, with shutter 820 partially transparent, light from pixel structure 800 will be a mixture of white light scattered at shutter 820 and scattered light having the tuned color of scattering layer 840. A range of transparencies of shutter 820 can thus be used to alter the relative mixture of white light and light at the tuned frequency. As a result, pixel structure 800 can display any of the colors corresponding to points on a line 824 in FIG. 8B when scattering layer 840 is tuned to the spectral color corresponding to point 844.

Pixel structure 800 can represent other colors by turning scattering structure 840 to other spectral colors. For example, if layer 840 is tuned to a color corresponding to a point 846 in FIG. 8B then controlling the transparency of shutter 820 can achieve the range of colors along a line 826 from white point 890 to spectral color point 846. Black and grayscale colors can be achieved through control of the transparency of shutter 820 when structure 840 is tuned to a scattering resonance outside the visible range. The range of colors achievable with pixel 800 thus covers most of the human perceivable colors.

Figure 9A:
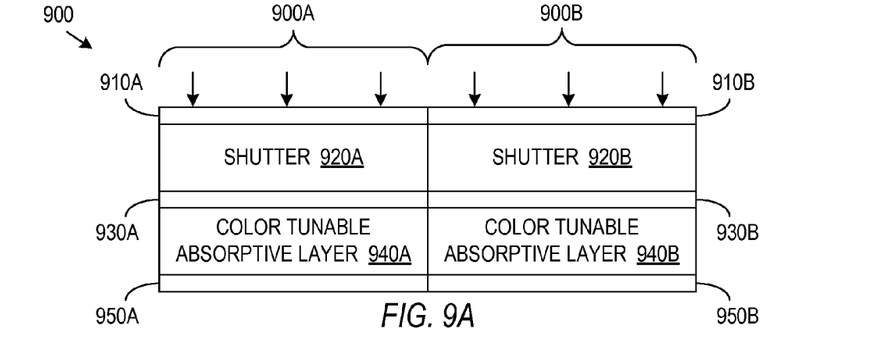
FIGS. 9A and 9B illustrate pixel structures in accordance with alternative embodiments of the invention having two-part horizontal architectures.
Figure 9B:
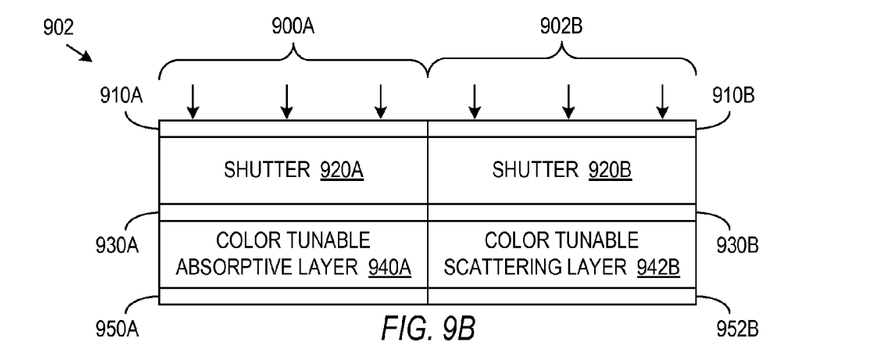

Alternative pixel structures can employ a vertical/stacked arrangement of color tunable layers or a horizontal arrangement of color tunable layers. FIGS. 9A and 9B illustrate horizontal two-part pixel structure 900 and 902 in accordance with two embodiments of the invention. Pixel structure 900 of FIG. 9A includes two sub-pixels 900A and 900B. In an exemplary embodiment, each sub-pixel 900A or 900B includes a transparent front plate 910A or 910B, a transparent-black shutter 920A or 920B, a transparent central plate 930A or 930B, a color-tunable absorptive layer 940A or 940B, and a white back plate 950A or 950B. Transparent plates 910A, 910B, 930A, and 930B can be made of a transparent conductive material such as ITO to act as electrodes for shutters 920A and 920B and or color tunable layers 940A and 940B, and back plates 950A and 950B can be any material with a suitably white color or coating and the required conductivity. Shutters 920A and 920B provide a range of transparency ranging from a maximally absorptive or black state to a nearly transparent state. Suitable shutters 920A and 920B can use color tunable structures such as described above, conventional liquid crystals with polarizers, or designs using electrophoretic, electrowetting, or mechanical technologies that are known in the art. Color-tunable absorptive layers 940A and 940B can use any of the above-described techniques to tune a range of frequencies of light absorbed, and layers 940A and 940B may have identical or differing color performance as described further below.

Pixel structure 900 can display the color white or shades of gray by shifting the plasmon resonance for both sub-pixels 900A and 900B out of the visible spectrum or tuning them to absorb complementary portions of the spectrum that, combined, give the perception of white, and controlling the transparency of shutters 920A and 920B to achieve the desired brightness. The maximum brightness depends on the reflectance of back plates 950A and 950B and on the transmittance of shutters 920A and 920B and absorptive layers 940A and 940B in their respective transparent states. The maximum brightness will also depend on the transparency of electrode layers 910A, 910B, 930A, and 930B and any polarizers (not shown) that may be included in shutters 920A and 920B or color-tunable layers 940A and 940B. Black, which corresponds to minimum brightness, is displayed by making both shutters 920A and 920B absorptive.

Pixel structure 900 can display other colors by tuning the two sub-pixels 900A and 900B to absorb appropriate wavelengths, while the amplitude (or brightness) of pixel 900 is controlled by partially opening shutters 920A and 920B. For example, one absorbing layer 940A can be tuned to absorb a portion of the visible spectrum peaked at a first wavelength corresponding to a point 992A in the chromaticity diagram 990 of FIG. 9C, so that the light reflected back through absorbing layer 940A corresponds to the incident light after subtraction or removal of light having frequencies near the tuned plasmon frequency. The apparent color of sub-pixel 900A that results from this absorption corresponds to a point 994A that is displaced from the white point 995 in FIG. 9C in a direction away from the absorbed spectral frequency point 992A. Similarly, the other absorbing layer 940B can be tuned to absorb a portion of the visible spectrum peaked at a second frequency corresponding to a point 992B in FIG. 9B, so that the apparent color of sub-pixel 900B corresponds to a point 994B in FIG. 9B that is displaced from the white point 995 in a direction away from the absorbed spectral frequency point 992B. The ratio of the transparency shutters 920A and 920B can then be controlled to mix colors corresponding to points 994A and 994B to produce the appearance of any of the colors on a line 922 between points 994A and 994B. The overall amplitude (or brightness) of pixel 900 then depends on the transparencies of shutters 920A and 920B.

Figure 9C:
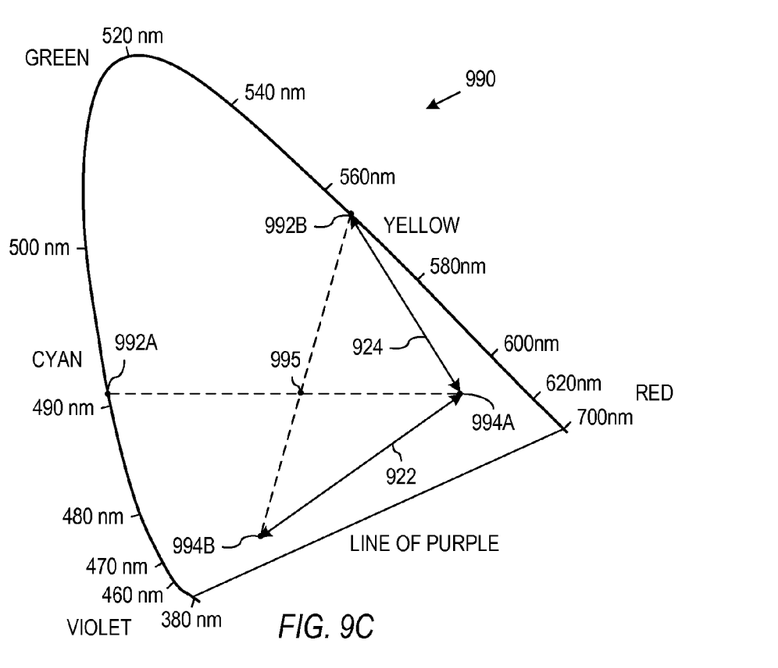
FIG. 9C is a chromaticity diagram illustrating the color performance of the pixel structures of FIGS. 9A and 9B.

The distances of points 994A and 994B from white point 995 will depend on the distances of points 992A and 992B from white. The distances will not necessarily be proportional. However, points 994A and 994B will tend to be near the boundary or "saturated" if respective points 992A and 992B are near the boundary of chromaticity diagram 990.

Tunable absorptive layers 920A and 920B in one implementation are tunable over different ranges of light wavelengths and are not required to be tunable over the entire visible spectrum. For example, absorptive layer 940A may be tunable to absorb wavelengths less than about 520 nm, while absorptive layer 940B is tunable to absorb wavelengths greater than 520 nm. With this configuration, sub-pixel 900A will provide a relatively larger contribution to colors on the right side of chromaticity diagram 900, and sub-pixel 900B will provide a relatively larger contribution to colors on the left side of chromaticity diagram 900. Accordingly, most of the colors perceptible to the human eye can be displayed with two color tunable structures, each tunable over a spectral range that covers only about one half of the visible spectrum.

The achievable color saturation of pixel 900 is partly determined by the shape of the plasmon absorption in absorptive layers 940A and 940B. This shape can be altered or optimized by choosing different materials, particle sizes, or particle shapes. Based on geometry, pixel structure 900 can provide better color saturation than conventional reflective pixels having horizontally arranged fixed color sub-pixels, e.g., red, green, and blue sub-pixels, because both of sub-pixels 900A and 900B can be tuned to provide the desired color. In addition, conventional horizontally-arranged configurations with three fixed colors can only use about a third of the available pixel area for display of some colors, e.g., red, green, or blue, thereby limiting the achievable brightness. With only two sub-pixels 900A and 900B in pixel structure 900 about one half or more of the available area of pixel structure 900 is active when producing any color, providing better brightness. Further, when both sub-pixels 900A and 900B are individually able to display a color, both sub-pixels 900A and 900B can be tuned to produce the desired color so that nearly 100% of the pixel area has the desired color, thereby yielding greater brightness. The side-by-side configuration of pixel structure 900 can also be brighter than a conventional stacked fixed-color configuration because it avoids the light losses inherent in the additional layers, such as electrode layers, employed in stacked configurations. However, pixel 900 may not be able to achieve some of the saturated colors that a stacked configuration described below can produce, such as saturated green hues.

An alternative configuration of pixel structure 900 replaces one of the white back plates 950A or 950B with a black plate and replaces the corresponding color-tunable absorptive layer 940A or 940B with a color-tunable layer optimized for scattering of light with a frequency range corresponding to the tuned resonance frequency of the color-tunable layer. FIG. 9B illustrates the example of a pixel structure 902 that is identical to pixel structure 900 as described above except that sub-pixel 900B is replaced with a sub-pixel 902B having a color tunable scattering layer 942B with a black back plate 952B. In this configuration, shutter 920A and color-tunable layer 940A over the white electrode 950A are made transparent to display white. Both shutters 920A and 920B are in the maximally absorptive state to display black, and are partially transparent to display other colors. The displayable colors of pixel structure 902 differ from the colors provided by pixel structure 900. For example, sub-pixels 900A and 902B when respectively tuned to have plasmon resonances with peaks corresponding to points 992A and 992B in FIG. 9B appear to have colors respectively corresponding to points 994A and 992B, i.e., one point corresponding to a spectral color and one point corresponding to removal of a spectral color. Variations of the ratio of the transparency of shutters 920A and 920B of pixel structure 902 for this example can provide a range of colors corresponding to the line segment 924 in chromaticity diagram 990. This alternative configuration with additive color from a sub-pixel with a black back absorber and subtractive color from an absorbing sub-pixel with a white back-reflector could improve the achievable color gamut of a display.

Figure 10:
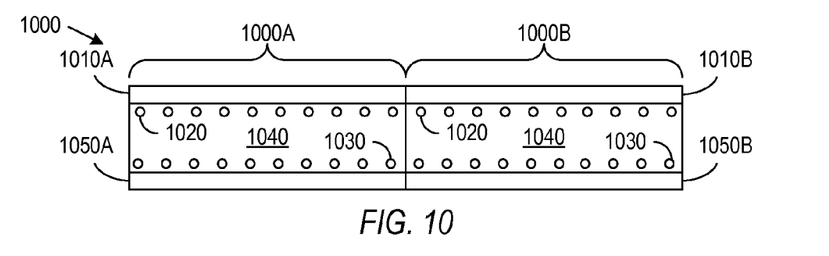
FIG. 10 illustrates a pixel structure in accordance with alternative embodiments of the invention having a two-part horizontal structure providing a compact combination of color tuning and shutter functions.

The color tuning capabilities of plasmon resonances as described above can be incorporated in pixel structures also employing fixed dye technologies and/or shutter functions. FIG. 10, for example, illustrates a pixel structure 1000 containing sub-pixels 1000A and 1000B that each achieves the color-tunability via metal-containing NPs 1020 and shutter or brightness control through movement of black particles 1030. NPs 1020 can be of any type but are preferably optimized for scattering of the tuned color, and black particles 1030 can be particles of a dark material such as carbon black having typical dimensions of about a few microns to a few nanometers. In each sub-pixel 1000A and 1000B, color-tunable NPs 1020 and black particles 1030 may be treated to be oppositely charged and suspended in a fluid 1040. Each sub-pixel 1000A or 1000B further includes a transparent front electrode or plate 1010A or 1010B and a back electrode or plate 1050A or 1050B.

Pixel structure 1000 can be used to display the color black by applying a bias to both pairs of plates to move black particles 1030 forward toward front plates 1010A and 1010B. Pixel structure 1000 can be used to display the other colors by applying independent biases to each pair of plates 1010A and 1050A or 1010B and 1050B to move black particles 1030 away from and move NPs 1020 toward front plates 1010A and 1010B. The relative concentrations of NPs 1020 and black particles 130 near front plates 1010A and 1010B can be continuously varied to control the brightness of sub-pixels 1000A and 1000B. The plasmon resonances of NPs 1020 are then tuned so that the combination colors sub-pixels 1000A and 1000B achieves the desired color for pixel 1000. For example, to display white, NPs 1020 in sub-pixels 1000A and 1000B are tuned to a complementary pair of colors that creates the impression of white (e.g., to blue and yellow or red and cyan scattering NPs 1020 or to absorb blue and yellow or red and cyan). To achieve other hues, the NPs 1020 are tuned to a pair of colors that together create the impression of that hue. The tuning can be controlled by controlling the degree of aggregation of NPs 1020 near the transparent electrode 1010A or 1010B, for example, through the application of the proper combination of AC and DC electric fields. As an alternative, additional shutter layers can be added as in the previous architectures. Further, different reflected intensity levels may be displayed by partially mixing the black particles 1030 and tunable NPs 1020.

Figure 11A:
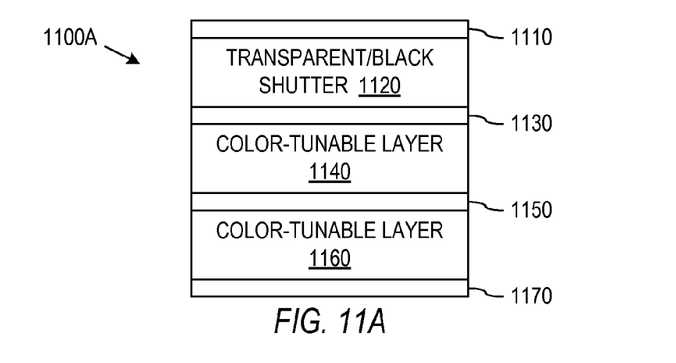
FIGS. 11A, 11B, and 11C illustrate pixel structures having stacked color-tunable layers in accordance with an embodiment of the invention.
Figure 11B:
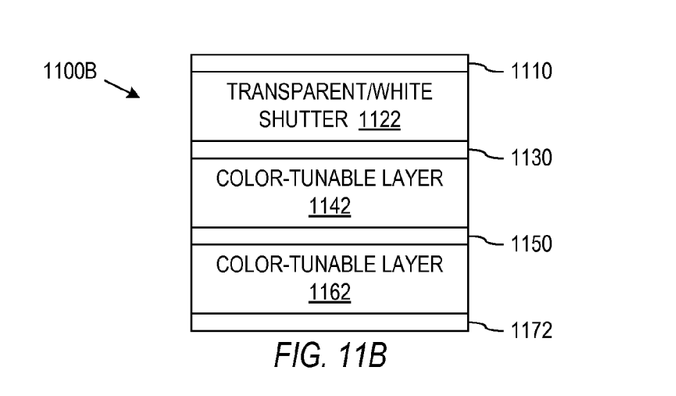
Figure 11C:
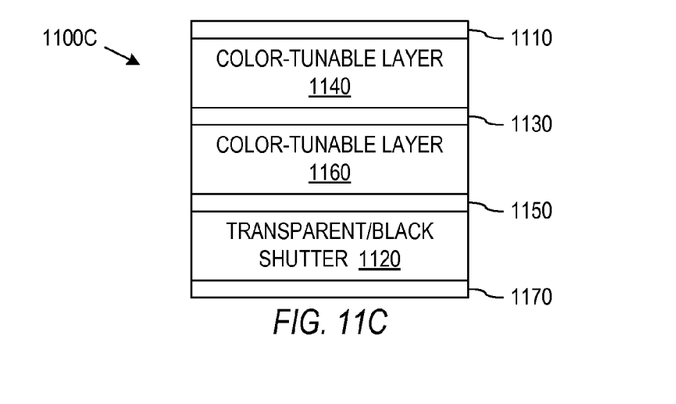

Other alternative pixel structure architectures can include stacked color-tunable layers. These stacked pixel structures can reduce the requirements on the shutters and backing layers in order to achieve independent control of hue and amplitude and may be less complex than conventional stacked pixel architectures because two color-tunable layers can replace three fixed color layers conventionally employed. FIGS. 11A, 11B, and 11C illustrate three examples of stacked pixel architectures in accordance with alternative embodiments of the invention.

A stacked pixel structure 1100A of FIG. 11A includes a transparent front plate 1110, a transparent-black shutter 1120, a first intervening transparent layer 1130, a first color-tunable layer 1140, a second intervening transparent layer 1150, a second color-tunable layer 1160, and a white back plate 1170. In operation, shutter 1120 controls the amplitude or grayscale level of reflected light from pixel 1100A. Color tunable layers 1140 and 1160 can be optimized to absorb wavelengths in bands respectively corresponding to first and second tunable wavelengths. The apparent color of pixel structure 1100A will thus be white or grayscale when both color-tunable layers are tuned to plasmon resonances outside the range of frequencies of visible light or are tuned to absorb complementary portions of the spectrum that, combined, give the perception of white, and will have a hue offset from white according to the tuning of layer 1140 and/or 1160. The use of two color tunable layers in pixel 1100A allows each of color-tunable layers 1140 and 1160 to have a range of tuning that covers only about one half of the frequency range of the visible spectrum.

A stacked pixel structure 1100B of FIG. 11B includes a transparent front plate 1110, a transparent-white shutter 1122, a first intervening transparent layer 1130, a first color-tunable layer 1142, a second intervening transparent layer 1150, a second color-tunable layer 1162, and a black back plate 1172. Color tunable layers 1142 and 1162 can be optimized to scatter wavelengths in bands respectively corresponding to first and second tuned wavelength ranges. In operation, pixel structure 1100B displays white by operating shutter 1122 in a maximally reflective state. Pixel structure 1100B displays black by operating shutter 1122 in a maximally transparent state and tuning layers 1142 and 1162 to wavelengths outside the visible spectrum, so that back plate 1172 absorbs incident light. To display other colors, pixel structure 1100B controls the transparency of shutter 1122 for amplitude control and controls tunable layers 1142 and 1162 to provide additive color. The use of two color tunable layers in pixel 1100B allows each of color-tunable layers 1142 and 1162 to have a range of tuning that is only about one half of the frequency range of the visible spectrum, but with a wider range of tuning may allow display of a greater color gamut.

A stacked pixel structure 1100C of FIG. 11C includes a transparent front plate 1110, a first color-tunable layer 1140, a first intervening transparent layer 1130, a second color-tunable layer 1160, a second intervening transparent layer 1150, a transparent-black shutter 1120, and a white back plate 1170. Color tunable layers 1140 and 1160 can be optimized to absorb wavelengths in bands respectively corresponding to first and second tuned wavelength ranges. In operation, color tunable layers 1140 and 1160 use subtractive color techniques to select a hue displayed by pixel structure 1100C, and the transparency of shutter 1120 controls the intensity of light reflected from white back plate 1170 and out of pixel structure 1100C.

Unlike most conventional paper-like display technologies, many of the embodiments disclosed here are capable of video rate operation. This is because the phenomena that are utilized are both fast and require little power to switch from one state to another. For example, electrophoretic embodiments that require sub-micron motions of NPs can be fast and low power. The same is true for techniques that rely on changing the phase or orientation of liquid-crystal molecules in which NPs are embedded (particularly if fast liquid crystals such as ferroelectrics are used). The embodiments described here also require less current for video rate operation than many of the conventional technologies based on electrochromic effects or redox reactions. Finally, the above-described plasmon-based pixel structures should be cyclable the large number of times necessary for video operation over a period of years, e.g., $10^9$ or more reversible changes of optical properties.

Although the invention has been described with reference to particular embodiments, the description is only an example of the invention's application and should not be taken as a limitation. Various other adaptations and combinations of features of the embodiments disclosed are within the scope of the invention as defined by the following claims.

What is claimed is:

1. A pixel structure comprising:
a first color-tunable layer having an apparent color that depends on a first plasmon resonance in the first color tunable layer;
a first tuning system coupled to control the first color-tunable layer and select a first frequency of the first plasmon resonance;
a shutter in a stack with the color-tunable layer; and
a back plate in the stack.

2. The structure of claim 1, wherein:
the apparent color of the color tunable layer results from scattering light in a frequency band around the frequency of the plasmon resonance;
the shutter is a transparent-to-white shutter that is operable in a range of transparencies; and
the back plate is black.

3. The structure of claim 1, further comprising:
a second color-tunable layer in the stack, wherein the second color tunable layer has an apparent color that depends on a second plasmon resonance in the second color tunable layer; and
a second tuning system coupled to control the second color-tunable layer and select a second frequency of the second plasmon resonance.

4. The structure of claim 3, wherein:
the shutter is a transparent-to-black shutter that is operable in a range of transparencies; and
the back plate is white.

5. The structure of claim 4, wherein the first and second color-tunable layers are between the shutter and the back plate, and each of the first and second color-tunable layers absorbs light with frequencies in bands respectively corresponding to the first and second frequencies.

6. The structure of claim 4, wherein the shutter is adjacent to the back plate, and the respective colors the first and second color-tunable layers result from scattering light in frequency bands around the first and second frequencies.

7. The structure of claim 3, wherein:
the shutter is a transparent-to-white shutter that is operable in a range of transparencies; and
the back plate is black.

8. The structure of claim 7, wherein the respective colors the first and second color-tunable layers result from scattering light in frequency bands around the first and second frequencies.

9. The structure of claim 1, wherein the first color-tunable layer comprises:
first particles in which the first plasmon resonances reside, the first particles being treated to hold a charge;
second particles having a fixed color, the second particles being treated to hold a charge that is opposite in polarity to the charge on the first particles;
a fluid in which the first and second particles are suspended; and
electrodes arranged to control concentrations of the first and second particles relative to a front surface of the layer.

10. The structure of claim 9, further comprising a second color-tunable layer positioned laterally adjacent to the first color-tunable layer, wherein the second color-tunable layer is substantially identical to the first color-tunable layer.

11. A pixel structure comprising:
a first color-tunable layer having an apparent color that depends on a first plasmon resonance in the first color tunable layer;
a first tuning system coupled to control a first frequency of the first plasmon resonance, the first tuning system selecting the first frequency from a first frequency range;
a second color-tunable layer having an apparent color that depends on a second plasmon resonance in the second color tunable layer; and
a second tuning system coupled to control a second frequency of the second plasmon resonance, the second tuning system selecting the second frequency from a second frequency range.

12. The structure of claim 11, further comprising:
a first shutter and a first back plate in a first stack with the first color-tunable layer; and
a second shutter and a second back plate in a second stack with the second color-tunable layer, wherein the second stack is horizontally adjacent to the first stack.

13. The structure of claim 11, wherein the first color-tunable layer overlies the second color-tunable layer in a stack.

14. The structure of claim 13, wherein the stack further comprises a shutter and a back plate.

15. The structure of claim 14, wherein the shutter comprises a transparent-black shutter, and the back plate is white.

16. The structure of claim 14, wherein the shutter comprises a transparent-white shutter, and the back plate is black.

17. A light shutter comprising:
a plurality of discrete structures having a plasmon resonance with a width corresponding to a range of frequencies to be gated by the light shutter; and
a tuning system coupled to control a peak frequency of the plasmon resonance, the tuning system being capable of switching the peak frequency between a first frequency within the range and a second frequency outside the range.

18. The light shutter of claim 17, wherein the range corresponds to visible frequencies of light.

* * * * *